Dec. 13, 1966 G. A. ASER ET AL 3,291,466
XEROGRAPHIC FIXING DEVICE
Filed Sept. 30, 1964 6 Sheets-Sheet 1

INVENTORS
GILBERT A. ASER
ROBERT H. FIGLER
THOMAS P. REDDING
BY
*Thomas P. Schneider*
*Arthur N. Krein*
ATTORNEYS

INVENTORS
GILBERT A. ASER
ROBERT H. FIGLER
THOMAS P. REDDING
ATTORNEYS

INVENTORS
GILBERT A. ASER
ROBERT H. FIGLER
THOMAS P. REDDING
BY
ATTORNEYS

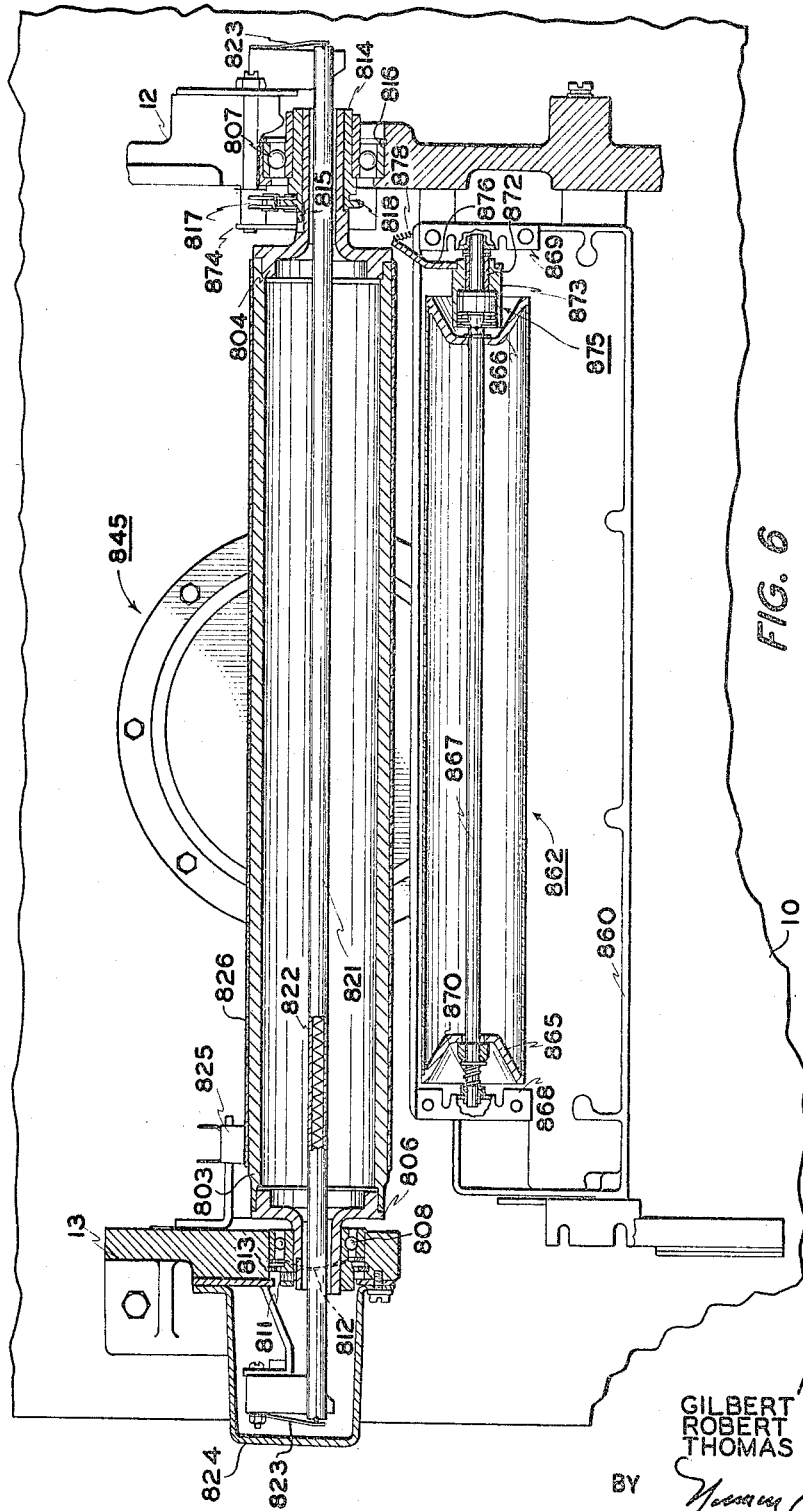

United States Patent Office 3,291,466
Patented Dec. 13, 1966

3,291,466
XEROGRAPHIC FIXING DEVICE
Gilbert A. Aser, Rochester, Robert H. Figler, Webster, and Thomas P. Redding, Penfield, N.Y., assignors to Xerox Corporation, Rochester, N.Y., a corporation of New York
Filed Sept. 30, 1964, Ser. No. 400,498
2 Claims. (Cl. 263—6)

This invention relates to improvements in heat fusing devices and, particularly, to an improved apparatus for fixing xerographic powder images.

More specifically, the invention relates to an improved heated-roll fusing device. Although the invention is considered to have general application, it is particularly useful in the field of xerography and has an important application in the fusing of resinous powder images produced by electrophotography or xerography onto sheets of paper and the like to which the powder images have been transferred after they have been formed by deposition of powder on an electrostatic latent image. Therefore, for convenience of illustration, the invention is described with reference to its use as a heat fuser for xerographic powder images. However, it is to be understood that it may be employed with equal facility in other fields.

In the process of xerography, for example, as disclosed in Carlson Patent 2,297,691, issued October 6, 1942, a xerographic plate, comprising a layer of photoconductive insulating material on a conductive backing, is given a uniform electric charge over its surface and is then exposed to the subject matter to be reproduced, usually by conventional projection techniques. This exposure discharges the plate areas in accordance with the radiation intensity that reaches them, and thereby creates an electrostatic latent image on or in the photoconductive layer. Development of the latent image is effected with an electrostatically charged, finely divided developing material or toner which is brought into surface contact with the photoconductive layer and is held thereon electrostatically in a pattern corresponding to the electrostatic latent image. Thereafter, the developed xerographic powder image is usually transferred to a support surface such as paper to which it may be fixed by any suitable means.

One of the methods in common use for developing the electrostatic latent image is described in Walkup Patent 2,618,551, and is known as cascade development, and is in general use for line copy development. In this technique, the powder or toner is mixed with a granular "carrier" material, and this two-component "developer" is poured or cascaded over the plate surface. The function of the carrier material is to improve the flow characteristics of the powder and to produce, on the powder, by triboelectrification, the proper electrical charge so that the powder will be attracted to the image. More exactly, the function of the carrier material is to provide the mechanical control to the powder, or to carry the powder to an image surface and, simultaneously, to provide homogeneity of charge polarity.

In the Carlson patent it is noted that a variety of types of finely divided electroscopic powders may be employed for developing electrostatic latent images. However, as the science of xerography has progressed, it has been found preferable to develop line copy images with a powder or toner formed of any of a variety of pigmented thermoplastic resins that have been specifically developed for the purpose. A number of such developing materials are manufactured and marketed commercially and are specifically compounded for producing dense images of high resolution and to have characteristics to permit convenient storage and handling. Such developing materials are compounded to permit them to be fixed to the surface of a transfer material either by heat fixing or vapor fixing techniques, in accordance with the particular application in which they are employed, that is, the individual particles of resin (toner) soften and coalesce when heated or plasticized by solvent, so that they become sticky or tackified and readily adhere to the surface of the support material.

The term "tackified" and the several variant forms thereof used throughout this specification are employed to define the condition of the powder particles of the xerographic powder image when heated or plasticized by a solvent in a manner such that the individual particles soften and coalesce and in which state they become sticky and readily adhere to other surfaces. Although this condition necessarily requires a flowing together of the particles to effect a thorough fusion thereof, it is to be understood that the extent of such flowing is not sufficient to extend beyond the boundary of the pattern in which the particles are formed.

One of the important applications of the process of xerography comprises its use in automatic copying machines for general office use wherein the powder images formed on a xerographic plate are transferred to paper and then fixed thereon by heat fusing. In order to fuse resinous powder images formed of the powdered resins now commonly used, it is necessary to heat the powder and the paper to which it is to be fused to a relatively high temperature, such as approximately 325° F. It is undesirable, however, to raise the temperature of the paper substantially higher than 375° F. because of the tendency of paper to discolor at such elevated termperatures.

It has long been recognized that one of the fastest and most positive methods of applying heat for fusing the powder image to paper is to bring the powder image into direct contact with a hot surface, such as a heated flat plate.

But, as the powder image is tackified by heat, part of the image carried by the support material will stick to the surface of the heated plate, so that as the next sheet is placed on the heated plate, the tackified image partially removed from the first sheet will partly transfer to the next sheet and, at the same time, part of the tackified image from said next sheet would ahere to the heated plate. This process is commonly referred to in the printing art as "set off" or "offset," the latter term being preferred.

The offset of toner onto the heated contacting surface has heretofore led to the rejection of contact fusers in favor of other heat fixing devices, primarily coiled radiant element heaters with reflectors. These radiant element heaters with reflectors have the disadvantage of dissipating a large quantity of heat into the machine enclosure in which they are used, heat transfer to the powder image is inefficient, and they present a safety hazard because of the exposed radiant element.

It is, therefore, the principal object of this invention to improve the construction of a direct contact fusing device for toner images which will rapidly fuse toner images without causing the toner particles to smear while in a tackified state or to offset onto the device.

Another object of this invention is to improve the construction of a direct contact fusing device to attain efficient heat transfer to the toner image to be fused.

It is still another object of the invention to improve the construction of a heat fixing device to have low standby power requirement.

These and other objects of the invention are attained by means of a direct contact fusing device in which the toner image is fused by forwarding the sheet or web of paper bearing the toner image between two rolls, one of which is heated, both rolls being provided with a thin coating of an abhesive material, such as a coating of Teflon, a Du Pont Corporation product composed of tetrafluoroethylene resin. The heated roll is provided with a silicone oil film to prevent toner offset. Both the Teflon and silicone oil have such physical characteristics that they are substantially abhesive to dry or tackified xerographic developing materials. "Adhesive" is a relatively new term that was coined by Dow Corning Corporation primarily in connection with their silicones to define a surface that has "release" characteristics such that it is highly repellent to sticky or tacky substances. The word is adopted in this sense herein and is so used throughout the disclosure.

For a better understanding of the invention, as well as other objects and further features thereof, reference is had to the following detailed description of the invention to be read in connection with the accompanying drawings, wherein:

FIG. 6 is a sectional view of the heat fuser taken along line 6—6 of FIG. 2, with the sheet conveyors removed and parts broken away to show details of the upper fuser roll and applicator roll.

Figure 1:
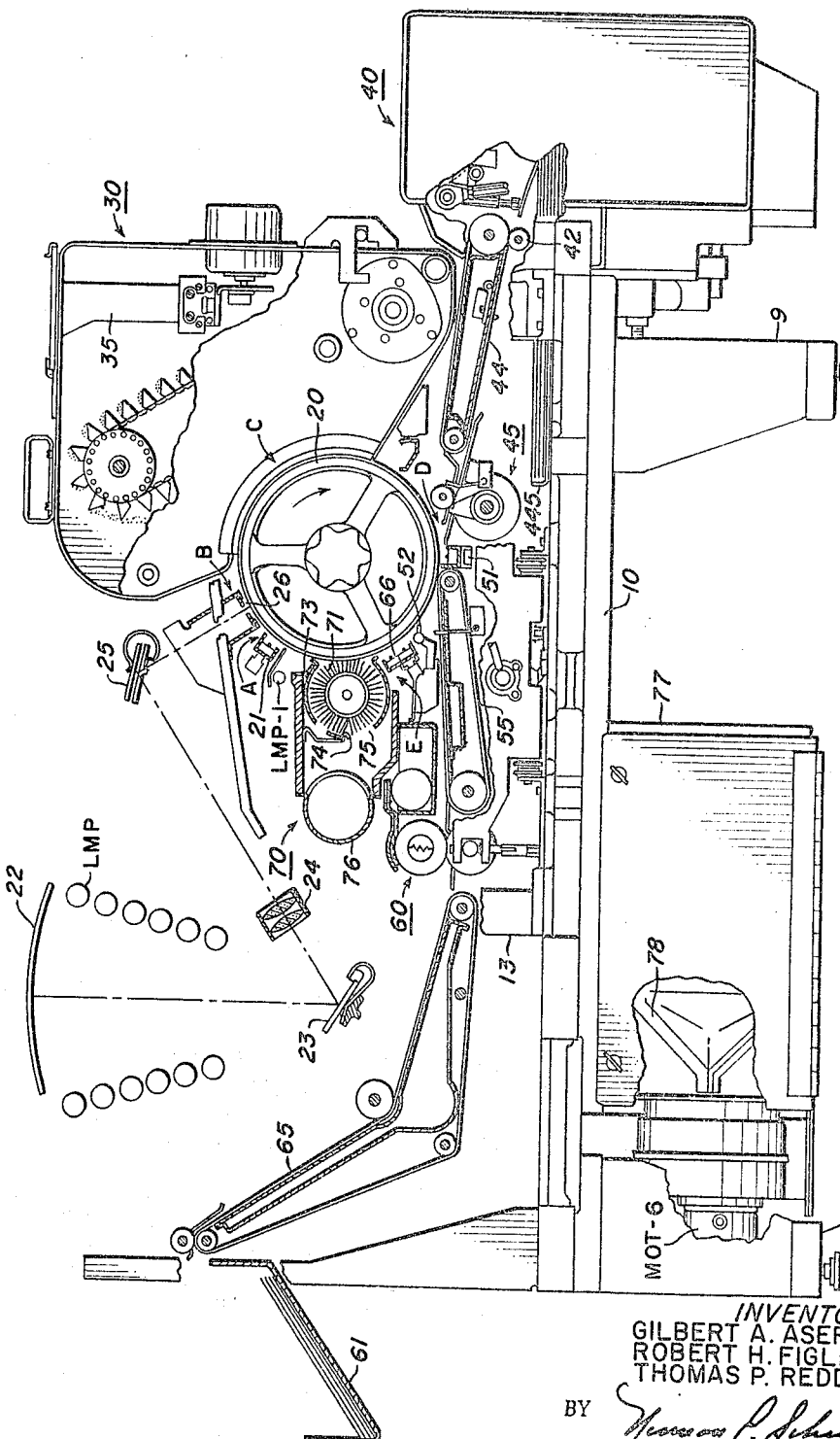
FIG. 1 illustrates schematically the preferred embodiment of a xerographic reproducing apparatus adapted for automatic operation, and incorporating a roller heat fuser constructed in accordance with the invention.
Figure 2:
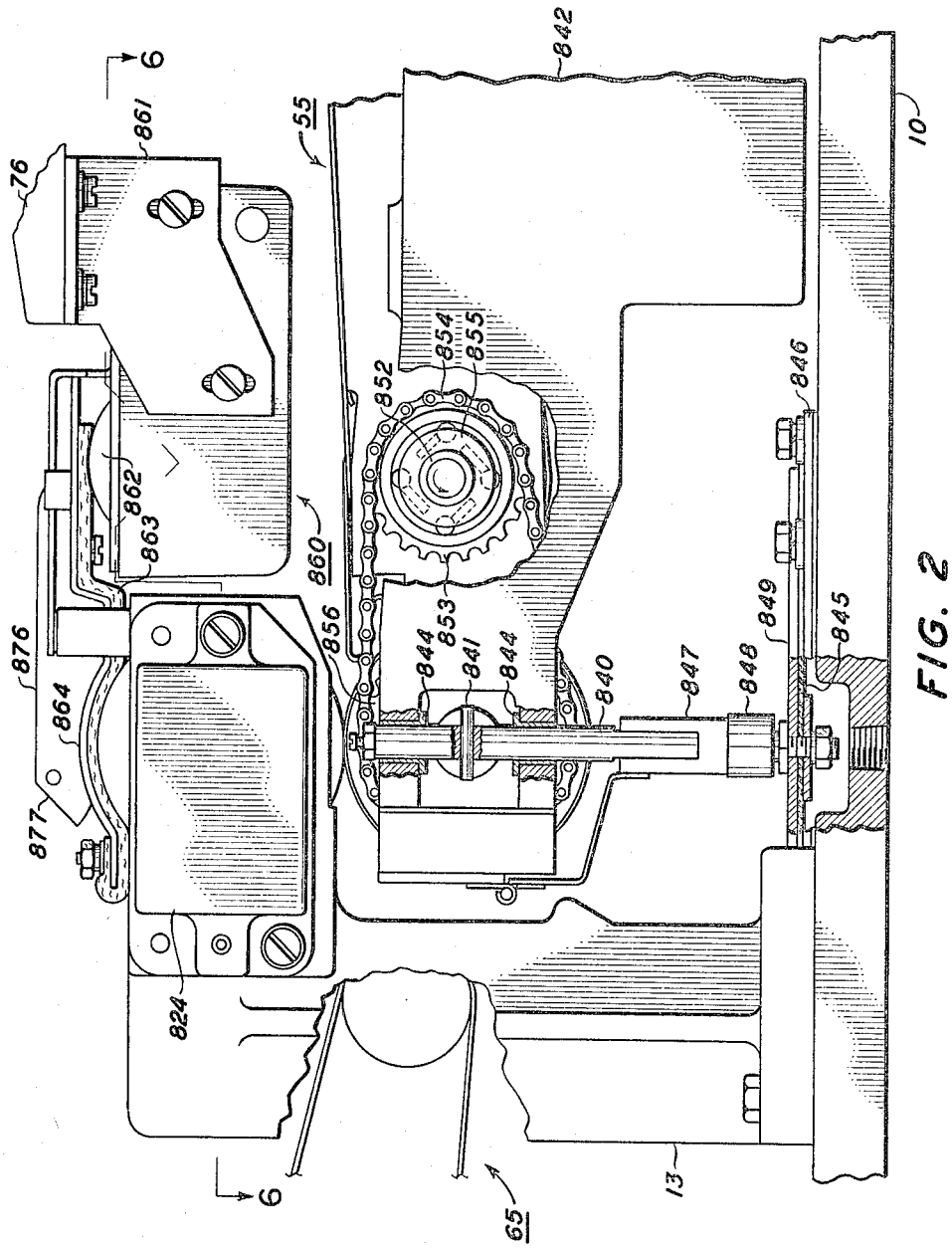
FIG. 2 is an enlarged front view of the heat fuser of FIG. 1.
Figure 3:
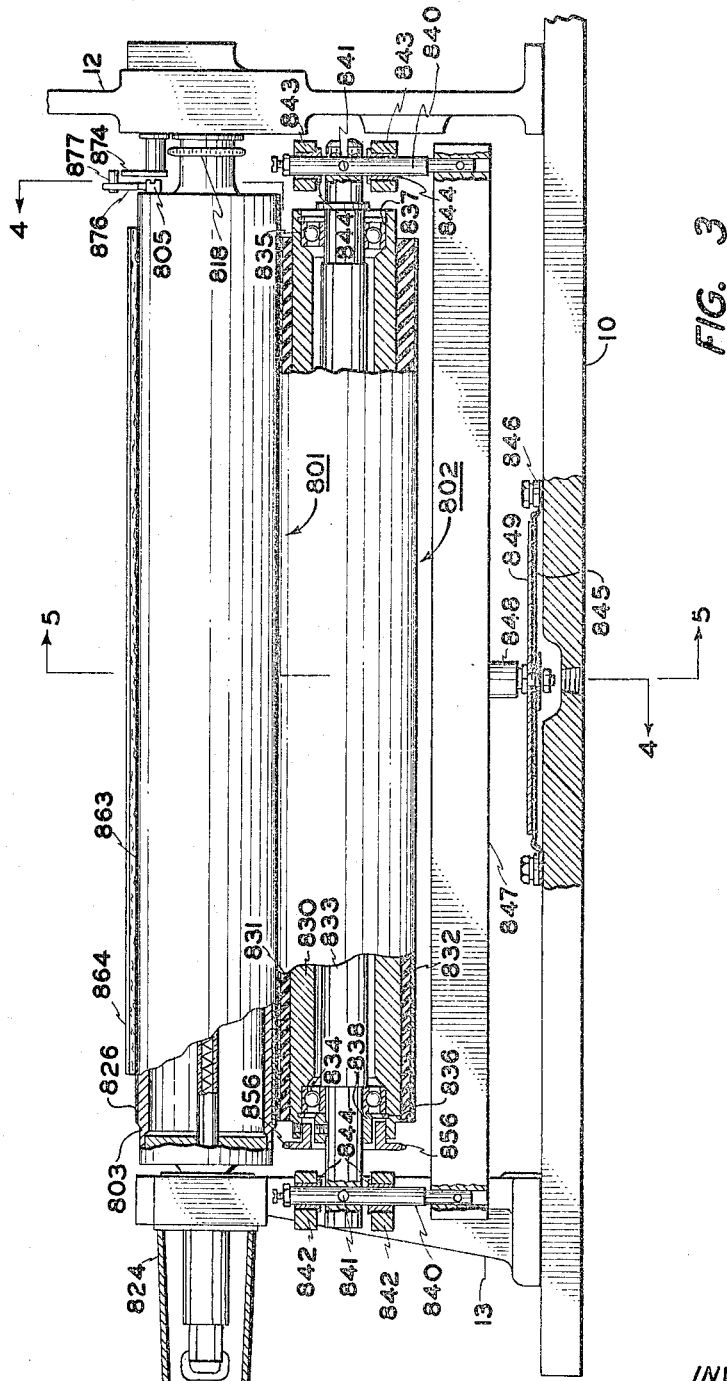
FIG. 3 is a left-hand side view of the heat fuser with parts broken away to show details of the fuser rolls and supports.
Figure 4:
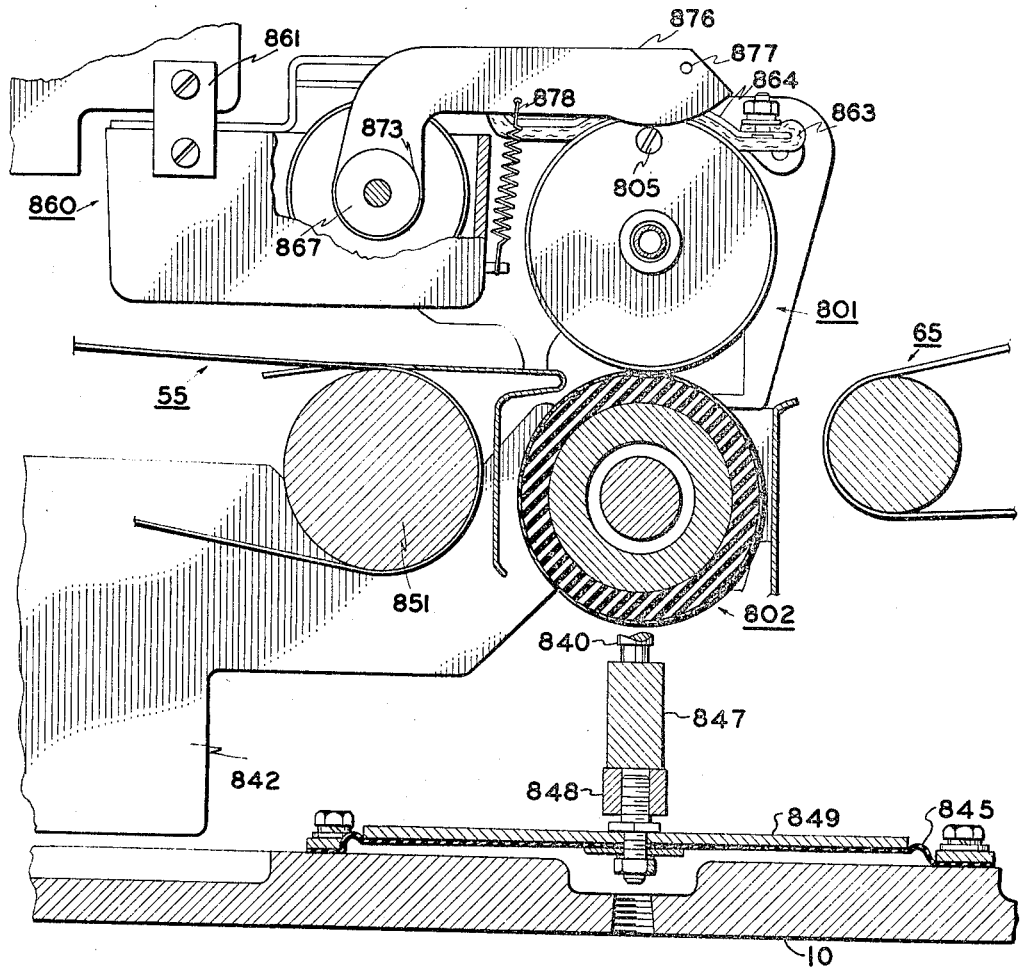
FIG. 4 is a sectional view taken along line 4—4 of FIG. 3, with parts broken away to show the structure of the fuser rollers and applicator.
Figure 5:
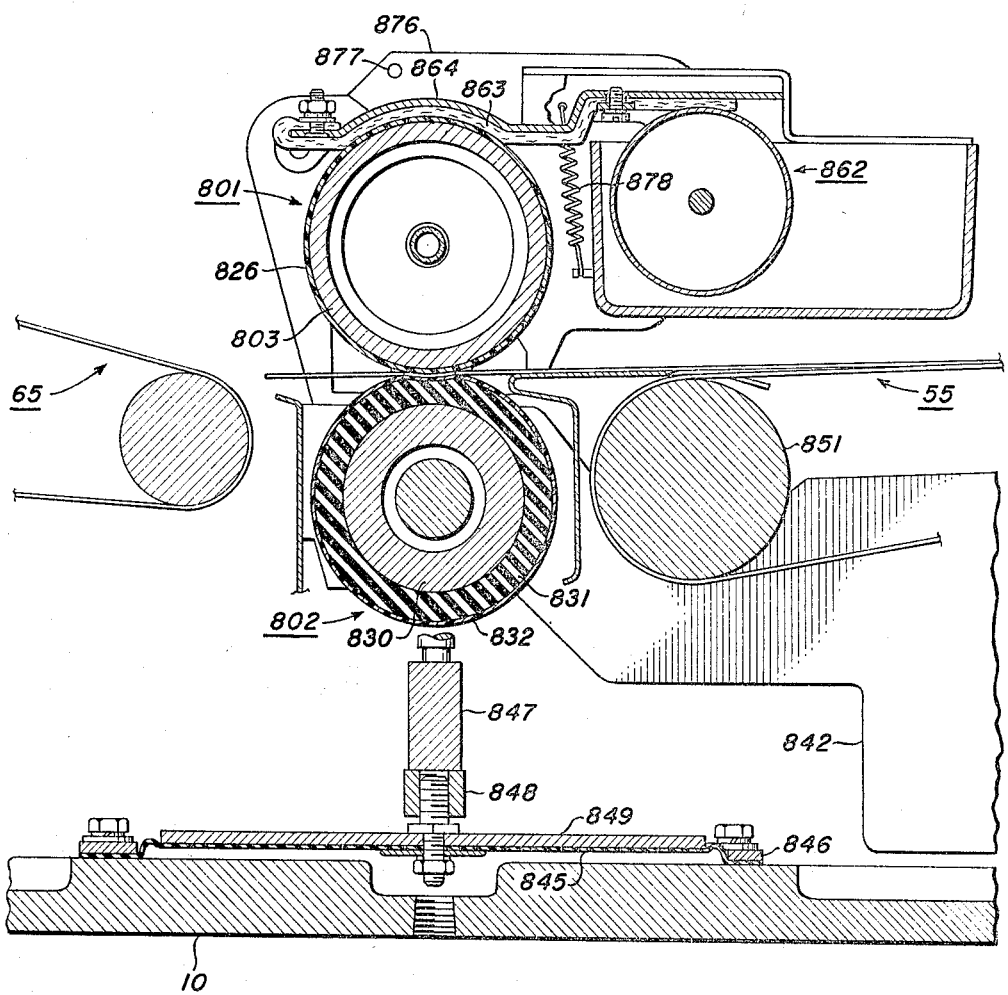
FIG. 5 is a sectional view taken along line 5—5 of FIG. 3.

Although it forms no part of the subject invention, there is shown schematically in FIG. 1 a continuous xerographic apparatus for the purpose of illustrating a suitable environment for the heat fuser of the subject invention.

As shown schematically in FIG. 1, the automatic xerographic reproducing apparatus comprises a xerographic plate 20 including a photoconductive layer or light-receiving surface on a conductive backing and formed in the shape of a drum, which is mounted on a shaft journaled in a frame to rotate in the direction indicated by the arrow to cause the drum surface sequentially to pass a plurality of xerographic processing stations.

For the purpose of the present disclosure, the several xerographic processing stations in the path of movement of the drum surface may be described functionally, as follows:

A charging station, at which a uniform electrostatic charge is deposited on the photoconductive layer of the xerographic drum;

An exposure station, at which a light or radiation pattern of copy to be reproduced is projected onto the drum surface to dissipate the drum charge in the exposed areas thereof and thereby form a latent electrostatic image of the copy to be reproduced;

A developing station, at which a xerographic developing material including toner particles having an electrostatic charge opposite to that of the electrostatic latent image are cascaded over the drum surface, whereby the toner particles adhere to the electrostatic latent image to form a xerographic powdered image in the configuration of the copy being reproduced;

A transfer station, at which the xerographic powder image is electrostatically transferred from the drum surface to a transfer material or support surface; and, A drum cleaning and discharge station, at which the drum surface is brushed to remove residual toner particles remaining thereon after image transfer, and at which the drum surface is exposed to a relatively bright light source to effect substantially complete discharge of any residual electrostatic charge remaining thereon.

The charging station is preferably located, as indicated by reference character A. As shown, the charging arrangement includes a corona charging device 21 which includes a corona discharge array of one or more corona discharge electrodes that extend transversely across the drum surface and are energized from a high potential source and are substantially closed within shielding member.

Next subsequent thereto in the path of motion of the xerographic drum is an exposure station B. An optical scanning or projection system is provided to project a flowing image onto the surface of the photoconductive drum from a stationary original.

The optical scanning or projection assembly comprises a stationary copyboard which consists of a transparent curved platen member 22 such as, for example, a glass plate or the like, positioned on the exterior of the cabinet, which is adapted to support a document to be reproduced, the document being uniformly illuminated and arranged in light projecting relation to the moving light-receiving surface of the xerographic drum. Uniform lighting is provided by banks of lamps LMPS arranged on opposite sides of the copyboard. Scanning of the document on the stationary copyboard is accomplished by means of a mirror assembly which is oscillated relative to the copyboard in timed relation to the movement of the xerographic drum.

The mirror assembly, which includes an object mirror 23, is mounted below the copyholder to reflect an image of the document through a lens 24 onto an image mirror 25 which, in turn, reflects the image onto the xerographic drum through a slot in a fixed light shield 26 positioned adjacent to the xerographic drum surface.

Adjacent to the exposure station is a developing station C in which there is positioned a developer apparatus 30 including a casing or housing having a lower or sump portion for accumulating developer material. A bucket type conveyor is used to carry the developing material to the upper part of the developer housing where it is cascaded over a hopper chute onto the xerographic drum to effect development. A toner dispenser 35 is used to accurately meter toner to the developing material as toner particles are consumed during the developing operation.

Positioned next and adjacent to the developing station is the image transfer station D which includes a sheet feeding arrangement adapted to feed sheets of support material, such as paper or the like, successively to the xerographic drum in coordination with the presentation of the developed image on the drum surface at the transfer station.

The sheet feeding mechanism includes a sheet feed device 40 adapted by means of vacuum feeders to feed the top sheet, of a stack of sheets on a tray 41, to rollers 42 cooperating with the belts of paper transport 44 for advancing the sheet sufficiently to be held by paper transport 44 which, in turn, conveys the sheet to a sheet registration device 45 positioned adjacent to the xerographic drum. The sheet registration device arrests and aligns each individual sheet of material and then in timed relation to the movement of the xerographic drum, advances the sheet material into contact with the xerographic drum in registration with a previously formed xerographic powder image on the drum.

The transfer of the xerographic powder image from the drum surface to the sheets of support material is effected by means of a corona transfer device 51 that is located at or immediately after the line of contact between the support material and the rotating drum. In operation, the electrostatic field created by the corona transfer device is effective to tack the support material electrostatically to the drum surface, whereby the support material moves synchronously with the drum while in contact therewith. Simultaneously with the tacking action, the electrostatic field is effective to attract the toner particles comprising the xerographic powder image from the drum surface and cause them to adhere electrostatically to the surface of the support material.

Immediately subsequent to the image transfer station, there is positioned a stripping apparatus to paper pick-off mechanism 52 for removing the sheets of support material from the drum surface. This device, which is of the type disclosed in Rutkus et al. United States Patent 3,062,536, includes a plurality of small diameter orifices supplied with pressurized aeriform fluid by a suitable pulsator or other device. The pulsator is adapted to force jets of pressurized aeriform fluid through the outlet orifices into contact with the surface of the xerographic drum slightly in advance of the sheet of support material to strip the leading edge of the sheet from the drum surface and to direct it onto an endless conveyor 55 whereby the sheet material is carried to a fixing device 60, the subject matter of this invention. At the fixing device, the transferred xerographic powder image on the sheet of support material is permanently fixed or fused thereto as by heat. After fusing, the reproduction is discharged from the apparatus at a suitable point for collection externally of the apparatus by means of the conveyor 65. In the embodiment shown, the reproductions are discharged from conveyor 65 into a receiving tray 61.

The next and final station in the device is a drum cleaning station E, having positioned therein a corona preclean device 66, a drum cleaning device 70 adapted to remove any powder remaining on the xerographic drum after transfer by means of a rotating brush 71, and a discharge lamp LMP-1 adapted to flood the xerographic drum with light to cause dissipation of any residual electrical charge remaining on the xerographic drum.

To remove residual powder from the xerographic drum, there is disposed a cylindrical brush 71 rotatably mounted on an axle and driven by a motor, not shown. For collecting powder particles removed from the xerographic drum by the brush, there is provided a dust hood 73 that is formed to encompass approximatley two-thirds of the brush area. To ensure thorough cleaning of the brush, a flicking bar 74 is secured to the interior of the dust hood adjacent the edge of the outlet duct 75 of the dust hood and in interfering relation with the ends of the brush bristles whereby dust particles may be dislodged therefrom.

For removing dust particles from the brush and dust hood, an exhaust duct 76 is arranged to cover the outlet of the dust hood, the exhaust duct being connected at its other end to the wall of a filter box 77 attached to the dust hood. A filter bag 78 is secured within the filter box, with the mouth of the filter bag in communication with the exhaust duct. Motor driven fans units connected to the filter box, produces a flow of air through the filter box drawing air through the area surrounding the xerographic drum and the dust hood, the air entraining powder particles removed from the drum by the brush as the air flows through the dust hood. Powder particles are separated from the air as it flows through the filter bag so that only clean air reaches the motor unit.

Suitable drive means are provided to drive the drum rotating mirror and sheet feed mechanism at predetermined speeds relative to each other, and to effect operation of the bucket-type conveyor and toner dispenser mechanism and the other operating mechanisms.

Referring to the drawings as shown in FIG. 1, there is provided a frame for supporting the components of the apparatus formed by a base plate 10 supported on legs 9. Vertical outboard and inboard frame plates 11 and 12, respectively, are secured to base plate 10 in spaced relation to each other.

The xerographic drum 20 is mounted on a horizontal driven shaft and the form is positioned between frames 11 and 12, with the major xerographic components of the machine mounted around the drum.

It is believed that the foregoing description is sufficient for the purposes of this application to show the general operation of a xerographic reproducing apparatus using a roller fusing device constructed in accordance with the invention. For further details concerning the specific construction of the xerographic apparatus shown, reference is made to copending application, Serial No. 400,542, filed on September 30, 1964, in the name of Robert F. Osborne et al.

Referring now to the drawings, there is shown a preferred embodiment of a heated roll fusing device 60 constructed in accordance with the invention.

In the embodiment shown, the heated roller fusing device includes a frame for supporting the upper roller of the fuser formed by frame plate 13 secured to the base plate 10 of the xerographic apparatus, and frame plate 12, the inboard frame of the xerographic apparatus. The lower fuser roller is supported in a position parallel to the upper roller by the frame of sheet conveyor mechanism 55. Although separate support means are shown in the preferred embodiment, it is understood that a single frame member may be used to support both rolls.

Direct contact fusing of a powder image on a support material is achieved by forwarding a sheet of support material bearing the powder image to be fused between a heated upper roller, generally designated 801, and an unheated lower roller, generally designated 802, rotating in intimate contact under pressure. The support material, carrying the unfused toner images, is advanced between these two rollers with the toner images facing the heated roller so that fusing occurs when contact is made.

As shown in FIG. 6, the upper roll 801 includes a cylinder 803 partly closed at opposite ends by right-hand and left-hand fuser roll caps 804 and 806, respectively, which are secured to the cylinder, as by a press fit. The roll is journaled for rotation by bearings 807 and 808 positioned in frame plates 12 and 13, respectively.

The inner race of bearing 808 is secured to cap 806 by a set screw 811. Thrust washer 812, which encircles the spindle portion of fuser roll cap 806 between the bearing 808 and a retaining ring 813, secured in a suitable groove provided in frame plate 13, retains the outer race of this bearing while allowing for expansion of heated roller 801 when in operation.

On the opposite end of the roller, the inner race of bearing 807 is secured to the hub portion of sprocket hub 814. Sprocket hub 814 encircles the spindle portion of cap 804, and is connected for rotation therewith by engagement of tab 815 on the sprocket hub with a suitable notch provided in the cap 804. The outer race of bearing 807 is retained in position in frame plate 12 by retaining ring 816 secured in a suitable annular groove in the frame plate.

Each of the fuser roll caps is provided with a suitable aperture to receive a quartz tube 821 which supports a suitable resistance heating element 822. Resistance element 822, which extends through roll 801, is connected by suitable conductors 823 to a source of power, the outboard conductor being covered by cap 824. A thermistor 825, part of an electrical control system for controlling power to the resistance element 822, is suitably positioned in thermal relation to this fuser roll. For further details concerning a preferred electrical control circuit for the fuser, reference is made of copending application, Serial No. 400,476, filed on September 30, 1964 in the name of Tayeb Bernous.

To prevent toner offset onto the heated roll contacting the unfused toner image on the support material, an offset preventing material 826 covers the outer surface of cylinder 803 of roll 801. A suitable material may be a coating of a product of tetrafluoroethylene resin sold under the trademark of Teflon by the Du Pont Corporation. Teflon is a chemically inert, non-porous and nonabsorbent, relatively hard and generally from retaining wax-like synthetic resin which is slightly elastic under low stress and which is capable of cold-flowing under greater stress, and which is capable of sliding over a surface in the manner of self-lubricating relationship therewith.

Upper roller 801 is driven in timed relation to the speed of conveyors 55 and 65 by means of a chain belt 817 operatively connecting the three mechanisms to a common source of power (not shown). The chain belt engages the sprocket 818 of the sprocket hub 814 secured to upper fuser roll 801. With this arrangement, roller 801 is driven at a speed equal to the lineal speed of the support material as it is delivered to the fuser by the endless conveyor 55 of the xerographic apparatus.

Roll 802 includes a rigid core 830 covered with a suitable resiliently deformable material 831, such as silicone rubber, which, in turn, is covered by a Teflon coating 832. The Teflon coating deforms with the rubber 831 in relation to the amount of pressure between heated roll 801 and roll 802 to form an arc of contact for proper fusing of the thermoplastic resin on the support material. The coating provides a protective covering on the rubber 831 to prevent deterioration of the rubber due to heat and/or contact with offset preventing liquid, the application of which is to be hereinafter discussed.

The roll 802 is rotatably supported on support shaft 833 by left-hand and right-hand bearings 834 and 835, respectively. The inner race of right-hand bearing 835 is secured to support shaft 833 as by a press fit. The outer race of this bearing is positioned on the shaft by a retaining ring 837 secured in a suitable groove provided in core 830. The outer race of left-hand bearing 834 is positioned on the shaft by a retaining ring 836 secured in a groove provided in core 830, and its inner race is positioned on support shaft 833 by a collar 838 secured to the shaft 833 by a set screw. A sprocket 856 for rotating roll 802 is secured to the left-hand side of core 830 by a set screw to enable the roll to be driven in a manner to be described.

The support shaft 833 supporting roller 802 is rigidly secured to sliders 840, by pins 841. The sliders are suitably journaled in the bifurcated ends of frame plates 842 and 843 of paper transport 55 by bushings 844 to permit roll 802 to be raised into a cooperating position with heated roll 801 for fusing toner particles onto the transfer material or lowered out of cooperative relation to roll 801.

Roll 802 is raised into pressure contact with roll 801 by operation of diaphragm 845 secured over a suitable cavity formed in the base plate 10 by means of a retaining ring 846 held in position by screws. The cavity in the base plate 10 is connected to a suitable source of pressure, such as a motor driven compressor (not shown), to effect vertical movement of the diaphragm 845 which raises a lift bar 847 by means of a lift block 848 suitably secured to diaphragm plate 849 and diaphragm 845. With this arrangement, roll 802 is brought into pressure contact with roll 801 while still permitting a sheet of support material to enter between these rolls.

The motor driven compressor is suitably connected to the electrical circuit of the xerographic apparatus whereby as the circuit is energized to advance sheets of material through the xerographic apparatus, the motor driving the compressor is energized to supply an aeriform fluid at a predetermined pressure to actuate the diaphragm to force roller 802 into contact with roll 801 or with a sheet of transfer material sandwiched therebetween. When the xerographic electrical circuit is deenergized or when sheets are not being advanced through the xerographic apparatus, the motor driven compressor is not operated and air pressure in this system is reduced, whereby roll 802 is permitted, due to its own weight and the weight of its supporting assembly, to lower itself out of contact with roll 801. Thus, during standby, when the fuser is not operating, the rollers 801 and 802 are automatically separated. This separation of the unheated roller out of contact with the heated roller prevents thermal set of the rubber.

Roll 801 and roll 802 must maintain identical velocity at their point of contact at all times when an image is being fused in the support material. This is necessary to prevent tearing the support material or distorting the image on the support material.

In the embodiment shown, the outer diameters of rolls 801 and 802 are equal and both rolls are driven by the same drive means at an identical angular velocity, the lineal speed at the roll's point of contact is the same for both rolls. However, when pressure is applied to roll 802 forcing it into contact with heated roll 801, the distance between the centers of rolls 801 and 802 decreases. The radius from the center of roll 801 to its point of contact with roll 802 remains constant owing to the material from which the roll is constructed. The radius of roll 802, from its center to point of contact with roll 801, is decreased by the pressure to provide an arm of contact to assure proper fusing.

If the angular velocities of the rolls are the same, this difference in radii would result in a differential lineal velocity at the point of contact with a resultant smearing of the tackified image and the possible tearing of the transfer material. In order to prevent any differential in lineal velocity at the point of contact of the rollers, an overriding clutch 855 is provided on roller 851 of transport 55. The outboard end of roller 851 is provided with a stub shaft portion 852 fixed to rotate with the roller and carrying at its outboard end an overriding clutch or oneway clutch 855, for example, a Miniclutch No. HV64A6A manufactured by the Miniclutch Co., Hamden, Connecticut. The driven portion of this clutch has fixed to it a sprocket 853 which is connected by chain 854 to sprocket 856 on the bottom roll 802 of fuser 60 to drive this roll of the heat fuser. By the use of overriding clutch or oneway clutch 855 to drive roller 802, the roller is free wheeling relative to the clutch; that is, an overrunning or oneway clutch allows a driven member to run at a greater speed than its driving member. This is true even when the driving member is stopped, reversed, or running at slower speed in relation to the driven member.

As a sheet of support material is advanced between the rolls 801 and 802, the powder image on the support material will contact the peripheral heated surface of roll 801 whereby the powder image becomes tackified and, in this tackified condition, the powder would tend to offset onto this roll except that it is partially prevented from doing so by a Teflon coating on the roll. However, to further prevent even this limited tendency of offset of toner onto the heated contact surface of roll 801, an applicator is used to supply a thin film of offset preventing liquid, such as silicone oil, to the Teflon coating 826 on roll 801.

A supply of silicone oil to be applied to roll 801 is maintained in an oil pan 860 having fastened to opposite ends thereof bracket means 861 by which the oil pan is mounted on the brush cleaner housing 76, not described in detail since it forms no part of the subject invention. An applicator roll, generally designed 862, is used to convey a thin film of oil as the applicator roll is rotated in the silicone oil, to a wick 863, such as a Teflon felt pad secured as by staples, not shown, to a wick support plate 864 in a manner whereby the pad rests on the peripheral surface of roll 801 and the applicator roll 862. The wiper plate is curved at one end to conform to the peripheral surface of roll 801.

The applicator roll 862 consists of a hollow cylindrical oil drum supported at opposite ends by caps 865 and 866. The oil drum is secured by these caps on shaft 867, which is journaled for rotation in brackets 868 and 869 supported by the oil pan 860. A compression spring 870 is axially supported on shaft 867 between bracket 868 and cap 865 to facilitate replacement of applicator roll 862, the spring normally biasing the applicator roll to the right as shown in FIG. 6.

To affect rotation of the applicator roller in one direction, the roller is driven by a one-way clutch 875 which is similar to previously described clutch 855. The driver elements of the clutch are enclosed by hub 873, rotatably journaled by bearing 572 on shaft 867, to which is secured a control arm 876. The control arm 876 driving one-way clutch mechanism 875, is provided with a depending cam surface portion adapted to be engaged when actuator stud 805 extending outward from roll cap 804 of the upper roller 801 is rotated into contact. Stud 877 of control arm 876 is biased into contact with pawl 874 fastened to frame plate 12 of the xerographic apparatus, by a spring 878 secured to the control arm 876 and to the oil pan 860. The speed of rotation of the applicator roll may be regulated by adjustment of pawl 874 which controls the arc of travel of the control arm 876 governing the one-way clutch mechanism 875. With this arrangement, as the upper roller is rotated through the drive mechanism previously described, the actuator stud 805 will strike the cam surface portion of the control arm to cause the control arm to oscillate about the axis of applicator 862 during each revolution of the upper roller 801. In this manner, the applicator roll is indexed, a portion of a revolution during each oscillating cycle of the control arm 876 through the one-way clutch drive between the applicator roll and the control arm.

For a given temperature of the upper roller 801, the fusing rate will depend on the contact arc length of the support material against this roller and the dwell time, i.e., the time the toner image remains between the rollers. Dwell time can be varied either by changing the surface velocity of the rollers or by varying the contact arc length and holding the speed of the rollers constant. Contact arc length depends on the softness of the rubber on roller 802 and on the amount of pressure between rollers 801 and 802.

In the embodiment of the apparatus shown, the hardness of the rubber used to form roller 802 was in the range of 25 to 65 durometer, and preferably the hardness of the rubber should exceed 40 durometer. By varying the pressure between the rollers, equal contact arc length can be obtained with the different hardness of the rubber.

While the present invention, as to its objects and advantages, has been described herein as carried out in specific embodiments thereof, it is not desired to be limited thereby, but it is intended to cover the invention broadly within the spirit and scope of the appended claims.

What is claimed is:

1. A contact heat fusing device for fixing thermoplastic resin material carried on a support material in image configuration, said device including
   frame means,
   a first roll journaled in said frame means,
   a second roll having deformable material and an outer protective coating of offset preventing material, said second roll being supported in said frame means for rotation and movement from a first position out of contact with said first roll to a second position in cooperating pressure contact with said first roll,
   actuator means connected to said second roll for moving said roll from said first position wherein said roll is out of operative relation with said first roll to said second position wherein said second roll is in cooperative relation to said first roll,
   the peripheral surface of said first roll being covered with a coating of an offset preventing material,
   means to apply an offset preventing liquid to said offset preventing material on said first roll,
   means to heat said first roll having direct contact with resin material carried on the support material,
   driving means connected to said first roll and to said second roll rotating said rolls to advance a support material therebetween, said first roll being driven at a predetermined fixed speed,
   said driving means including overriding torque means connected to said second roll enabling the same lineal speed at the point of contact of said first and second rolls to be maintained when said second roll is in pressure contact with said first roll.

2. The apparatus of claim 1 wherein the offset preventing material of said first roll and of said second roll is Teflon.

References Cited by the Examiner

UNITED STATES PATENTS

| | | |
|---|---|---|
| 2,501,445 | 3/1950 | Carroll et al. |
| 3,132,047 | 5/1964 | Van Dorn. |
| 3,157,786 | 11/1964 | Limberger _____ 260—65.1 |
| 3,214,585 | 10/1965 | Stroszynski _____ 260—65.1 |

FREDERICK L. MATTESON, JR., *Primary Examiner*,

D. A. TAMBURRO, *Assistant Examiner*,